Figure 1:
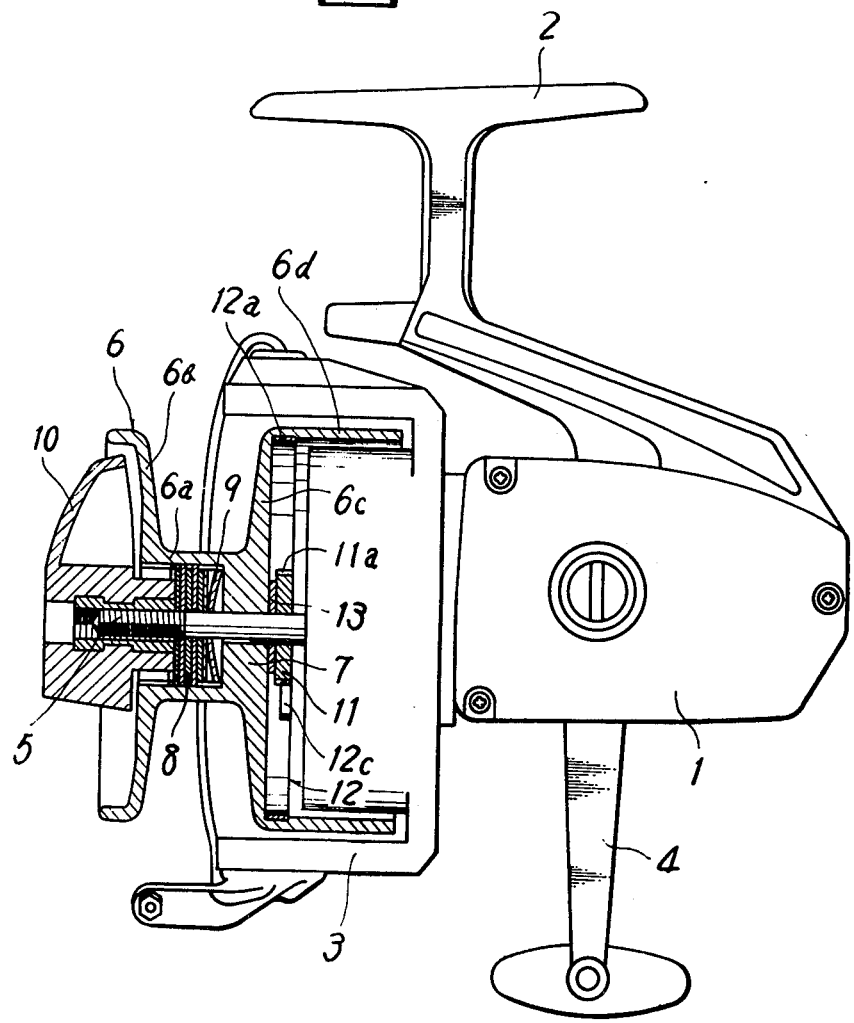

United States Patent [19]

Hamayasu et al.

[11] 4,173,317
[45] Nov. 6, 1979

[54] SOUND GENERATING MECHANISM FOR A SPINNING REEL

[75] Inventors: Norio Hamayasu, Sakai; Kiyohide Kamikawa, Osaka, both of Japan

[73] Assignee: Shimano Industrial Company, Limited, Osaka, Japan

[21] Appl. No.: 884,425

[22] Filed: Mar. 8, 1978

[30] Foreign Application Priority Data

Mar. 18, 1977 [JP] Japan .............................. 52-33772[U]
Mar. 18, 1977 [JP] Japan .............................. 52-33773[U]

[51] Int. Cl.² ............................................ A01K 89/01
[52] U.S. Cl. ...................... 242/84.21 R; 242/84.51 A
[58] Field of Search .................... 242/84.5 A, 84.51 R, 242/84.5 R, 84.2 R, 84.51 A, 84.21 R, 84.1 R, 84.2 C

[56] References Cited
U.S. PATENT DOCUMENTS

| | | | |
|---|---|---|---|
| 361,890 | 4/1887 | Pettengill | 242/84.51 R |
| 2,558,896 | 7/1951 | Young et al. | 242/84.51 R |
| 3,743,207 | 7/1973 | McMickle | 242/84.51 A |

Primary Examiner—George F. Mautz
Attorney, Agent, or Firm—Stevens, Davis, Miller & Mosher

[57] ABSTRACT

A sound generating mechanism for a fishing spinning reel comprises sounding teeth attached in a stationary manner to a spool spindle, and a sound generating element in mesh with the teeth. The sound generating element is formed of a strip of elastic material and incorporated with a support bent in a circular arc and in elastic contact with the inner periphery of the spool, an expansion portion, and a sound generating portion, so that when the spool is rotated to draw out a fishing line the support expands diametrically to jam onto the inner periphery of spool to thereby cause the sound generating portion to move relative to said teeth and make a sound, while, when rotated reversely the sound generating portion contracts to slide with respect to the inner periphery of the spool such that said sound generating portion does not move relative to said teeth and thereby generates no sound.

8 Claims, 7 Drawing Figures

SOUND GENERATING MECHANISM FOR A SPINNING REEL

This invention relates to a sound generating mechanism attached to a fishing spinning reel so as generate a sound when a spool rotates in the direction of drawing out a fishing line to thereby enable an angler to be apprised of the drawing out of the line, and more particularly to a sound generating mechanism which is adapted to generate a sound by use of the rotation of spool when the line is drawn out therefrom by a hooked fish, thereby enabling the angler to be apprised of the drawing out of the line.

A conventional fishing reel adopts this kind of sound generating mechanism. The mechanism attached to a spinning reel is constructed of a sounding gear and cooperating pawl, the gear having at its outer periphery a large number of teeth and fixed to a spool spindle and the pawl being fixed to the spool to be meshed with the teeth, so that the sound generating mechanism may click when a hooked fish pulls the fishing line as its drawn from the spool. That is, the spool rotates following the drawing-out of the line to allow the pawl to move over each of the teeth so that the sound generating mechanism may click in succession, thereby warning the angler of the line being drawing out. The pawl is slant at its tip in the direction of spool rotation when the line is drawn out, thus enabling the pawl to be properly meshed with the gear to generate the clicking sound.

If the angler reversely rotates the spool by mistake when using the spinning reel with the conventional sound generating mechanism described above, the pawl is forced to unsmoothly mesh with the teeth causing the generated sound to become dim while the pawl becomes deformed or damaged.

This invention has been designed to eliminate the aforesaid defect. An object of the invention is to provide a fishing reel having a sound generating mechanism capable of always reliably clearly sounding, thus, enabling the angler to be easily appraised of the fishing line being drawn out without fear that the sound generating mechanism will be, when the spool is rotated reversely to the line draw-out direction, of its clean sound and happens to be deformed or damaged.

The invention is characterized in that the sounder generating element in mesh with the sounding teeth is not fixed to the spool is supported elastically onto the inner periphery thereof, and the spool, when rotating to draw out the line, allows the sound generating element to be diametrically expanded following the spool rotation so that it jams onto the inner periphery of the spool, while, when rotating reversely, contracts the sound generating-element so that it is slidable against the spool. As a result the sound generating portion of the sound generating element is not subjected to an excessive force, thus ensuring the generation of a succession of always clean clicking sounds.

In greater detail, the sound generating element is; formed of a strip of elastic material, for example, a strip of leaf spring or a piano wire; incorporated with a support bent in a circular arc to be in elastic contact with the inner periphery of the spool; elastically supported thereto in such a manner that the extension is positioned ahead of the support in the direction of rotating the spool to draw out the fishing line therefrom, so that the support expands diametrically to be locked on the inner periphery of the spool.

Figure 2:
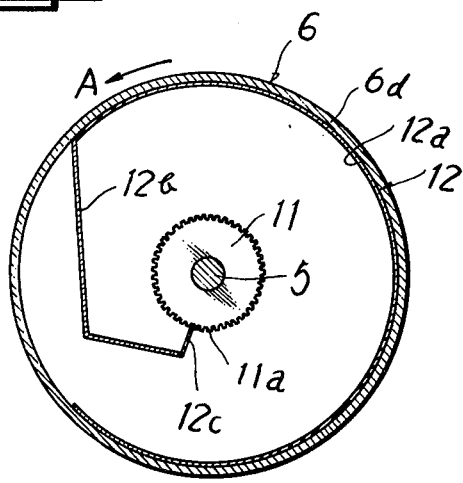
Figure 3:
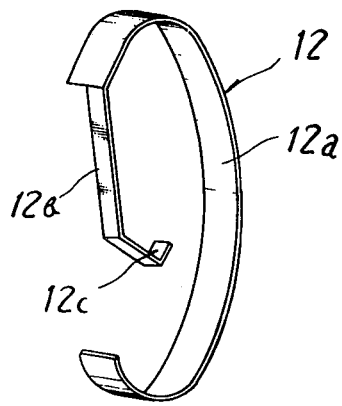
Figure 4:
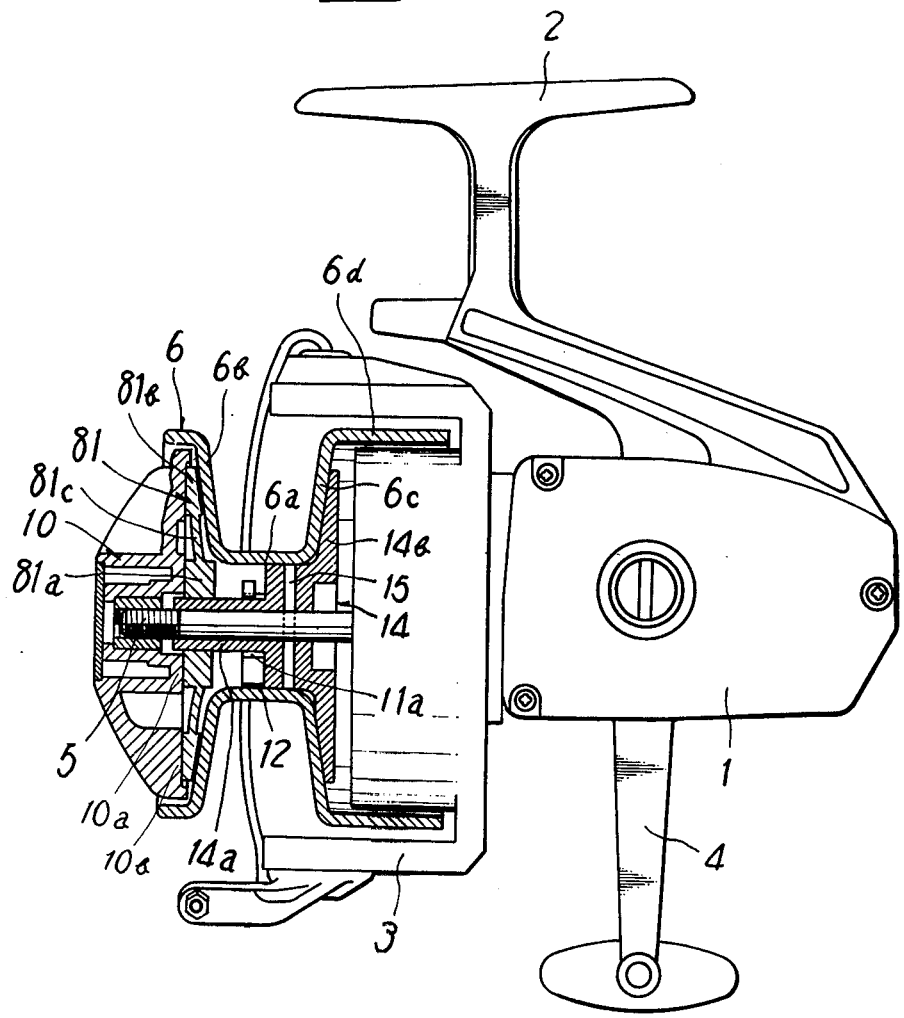
Figure 5:
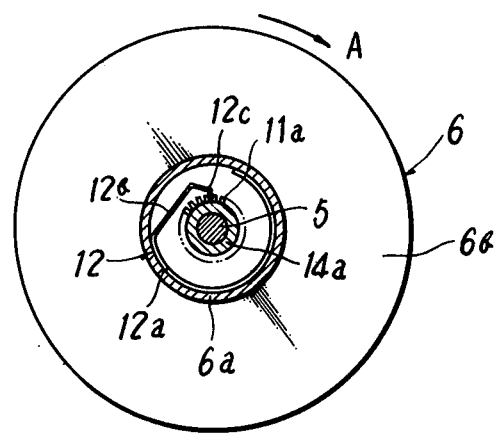
Figure 6:
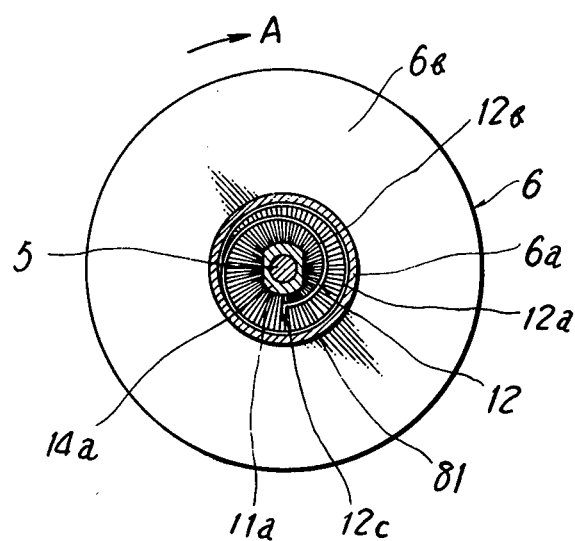
Figure 7:
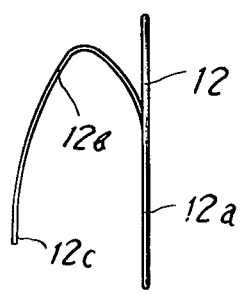

Further objects and advantages of the present invention will be apparent from the following description, reference being made to the accompanying drawings wherein a preferred form of the present invention is clearly shown. In the drawings:

FIG. 1 is a partially longitudinal/sectional side view of a spinning reel having the sound generating mechanism of the invention, FIG. 2 is a front view showing an embodiment of the sound generating mechanism in FIG. 1, FIG. 3 is a perspective view of only the sound generating-element used for the sound generating mechanism, FIG. 4 is a partially longitudinal/sectional side view of the spinning reel providing the sound generating mechanism at a position different from that ly in FIG. 1, FIG. 5 is a partially sectional front view of the embodiment of the sounding mechanism of the invention shown in FIG. 4, FIG. 6 is a partially sectional front view of a modified embodiment of sound generating-element mechanism of the invention, and FIG. 7 is an enlarged side view of only the sound generating-element used in the sound generating mechanism in FIG. 6.

Prior to description of the sound generating-mechanism of the invention, the spinning reel to which it is applied will be generally described in accordance with FIGS. 1 and 4.

The spinning reel is well known. It includes a reel body 1 having a crank handle 4 and a leg 2 with which the reel is attached to a fishing rod (not shown). To the reel body 1 is rotatably supported a rotor 3 which is rotatable by operating the crank handle 4. Rotor 3 is non-rotatably but only axially movably to a spool spindle 5 which passes through the center of the rotor 3 to project outwardly therefrom, the rotatably supporting a spool 6. The spool 6 comprises a cylindrical trunk 6a onto which the line is wound up, a front (at the leftside in the drawings) wall 6b, and a rear (at the left side) wall 6c which are provided at both axial ends of the trunk 6a, and a cylindrical wall 6d extending from the rear wall 6c outwardly thereof.

A drag mechanism is provided at the spool 6 for applying resistance against its rotation. The drag mechanism may be of different types as shown in FIGS. 1 and 4. One type, illustrated in FIG. 1, comprises: a base 7 formed within the trunk 6a of the spool 6; a leaf spring 9 and a plurality of drag plates 8, arranged in layers within the trunk 6a, approximately half the drag plates being made non-rotatable with respect to the spool spindle 5 and the remainder non-rotatable with respect to the spool 6; and an adjusting knob 10 screwed to one axial end of the spool spindle 5. The knob 10 is turned to urge the drag plates 8 and leaf spring 9 toward the base 7 so that the frictional resistance may be applied to the spool 6 against its rotation with respect to the spool spindle 5. The stopper 13 in FIG. 1 is fixed to the spool spindle 5 so as to restrict the spool 6 from moving axially rearward (rightward in FIG. 1).

The other type of drag mechanism, shown in FIG. 4, has a control element 14 fixed to the spool spindle 5 for restricting the spool 6 from moving axially rearward (rightward in FIG. 4), one drag plate 81 which is, elastically deformable and is supported to the control element 14 and only axially movably of the spool spindle 5, and an adjusting knob 10 screwed to one axial end of the spool spindle 5, so that the knob 10 is turned to urge the drag plate 81 toward the spool 6 to thereby apply thereto a desired frictional resistance.

In greater detail, the control element 14 comprises a tubular portion 14a sleeved onto the spool spindle 5 and a disc 14b in contact with the rear wall 6c of the spool 6, and is fixed to the spool spindle 5 by a pin 15 pouring therethrough radially from the tubular portion 14a.

The drag plate 81 is disc-like shaped and has at the center thereof a boss 81a fitted onto the tubular portion 14a of the control element 14, at the outer periphery a contact area 81b in contact with the outer surface of the front wall 6b, and between the contact area 81b and boss 81a an interconnecting portion 81c which is thin and elastically deformable.

The adjusting knob 10 comprises a first pusher 10a contacting with the boss 81a to urge it rightward in FIG. 4 and a second pusher 10b contacting with the contact area 81b to urge it against the outer surface of the front wall 6b. The knob 10 is turned to push the boss 81a through the first pusher 10a and deflect the interconnecting portion 81c, so that the contact area 81b is jammed onto the outer surface of the front wall 6b, thereby applying to the spool 6 a first desired frictional resistance. The knob 10 is further turned to allow the second pusher 10b to press the contact area 81b directly, thereby applying to around spool 6 the desired frictional resistance greater than the first.

The drag mechanism shown in FIG. 4 is novel having been invented by one of the inventors of the present invention and is described in detail in copending U.S. application Ser. No. 876,663 filed Feb. 10, 1978.

To the spinning reel described above, the present invention adds sounding teeth 11a which are stationary with respect to the spool spindle 5 and a sound generating element 12. The sound generating element 12 in mesh with the teeth 11a to generate a sound is, as shown in FIGS. 2, 3, 5 and 7, formed of a strip of elastic material, such as a leaf spring or piano wire, and comprises; a support 12a bent in a circular arc and elastically abutted against the inner periphery of the spool 6, that is, of either the trunk 6a or cylindrical wall 6d; an extension 12b extending radially inwardly from the tip of the support 12a, and a sound generating-element portion 12c provided at the end thereof; which are connected in succession. Also, the sounder 12 is attached to the inner periphery of the spool 6 in such a manner that the extension 12b is, as shown in FIGS. 2, 5 and 6, positioned ahead of the support 12a in the direction (shown by the arrow A) of spool 6 rotation to draw out the line so that the sounding portion 12c may be meshed with the teeth 11a.

In FIGS. 1 through 3, the teeth 11a are provided at the outer periphery of a disc 11. The disc 11 is positioned rearward of the rear wall 6c of the spool 6 and fixed to the spool spindle 5. The sound generating element 12 is formed of a leaf spring, whose round support 12a has its outer diameter slightly larger than the inner diameter of the cylindrical wall 6d so as to be fitted thereinto in elastic abutment against the inner periphery of the wall 6d.

In this embodiment, the extension 12b and sound generating portion 12c may have the same width as the support 12a but are preferred to be as narrow as possible as shown in FIG. 3.

The sound generating element 12 shown in FIGS. 4 and 5, cooperate with the sounding teeth 11a formed directly at the outer periphery of the tubular portion 14a of the control element 14, and has the support 12a elastically abutted against the inner periphery of the trunk 6a of the spool 6. In this instance, the outer diameter of the support 12a is also made slightly larger than the inner diameter of the trunk 6a.

Next, description will be provided of the spinning reel incorporated with the sound generating-mechanism described above.

The angler operates the crank handle 4 to rotate the rotor 3 so as to wind up the line onto the spool 6 for bringing a hooked fish within reach. If the hooked fish is small its pull on the line will not be very forceful and the frictional resistance applied to the spool 6 by drag mechanism will overcome this pull so that the line is wound up onto the spool 6 which is kept non-rotatable with respect to the spool spindle 5.

On the other hand, when a big hooked fish pulls the line to overcome the frictional resistance of the drag-mechanism, the drag plates 8 or 81 (FIGS. 1 or 4) slide to allow the spool 6 to rotate in the direction shown by the arrow A in FIG. 2 or 5, thereby drawing out the line wound on the spool 6. Thus, the line is drawn out without being cut to play the fish until it tires. When this occurs, the spool 6 rotates to allow the support 12a of the sound generating element 12 to expand diametrically. In detail, the support 12a, which is curved in involute reversely to the direction A of rotating the spool 6, is diametrically expanded by the rotation of spool 6, thus having the support 12a contact with the inner periphery of the spool 6 with greater force. As a result, the sound generating element 12 is locked to the spool 6 so as to be rotatable integrally therewith.

Accordingly, the tip of the sound generating portion 12c moves over each of the teeth 11a sequentially to make the so-called clicking sound, thereby apprising the angler of the drawing out of the line.

If the angler carelessly rotates the spool 6 reversely to the direction of the drawing out of the line (shown by the arrow A), the sound generating element 12 is diametrically contracted to release its elastic abutment with the spool 6 so that the spool 6 runs idle with respect to the support 12a. As a result, the sound generating portion 12c cannot be forcibly improperly meshed with the teeth 11a which would lead to deformation or damage of the sound generating element 12.

The sound generating mechanism applied to the spinning reel shown in FIG. 4, may, as shown in FIG. 6, have the teeth 11a provided at the rear side (the right side in FIG. 4) of the drag plate 81 and the sound generating element 12 in elastic abutment against the inner periphery of the trunk 6a of the spool 6, so that the sound generating portion 12c may be meshed with the teeth 11a. In this instance, the sound generating element 12 is formed of a piano wire bent in a spiral as shown in FIGS. 6 and 7.

As seen from the aforesaid description, the sound generating mechanism of the invention enables the angler to be apprised of the drawing out of the line by the spool being rotated by the drawn-out line pulled by a hooked fish which causes expansion of the sound generating element diametrically to thereby lock its support onto the inner periphery of the spool; thus, the sound generating portion sequentially moves over each of the teeth to make a clicking sound in succession. Meanwhile, if the angler carelessly rotates the spool reversely, the sound operating element slides with respect to the spool and becomes disconnected therefrom such that only the spool rotates to prevent the sound generating element from being forcibly improperly meshed with the teeth. Hence, the sound generating element always clicks clearly while being free along with the teeth from deformation or damage.

Although several embodiments have been described, they are merely exemplary of the invention and not to be construed as limiting, the invention being defined solely by the appended claims.

What is claimed is:

1. A sound generating mechanism provided at a spinning fishing reel, the latter comprising a reel body with a crank handle; a rotor supported to said reel body and rotatable by operating said crank handle; a spool spindle supported to said reel body in relation of being non-rotatable but axially movable only; a spool supported rotatably to said spool spindle and comprising a trunk onto the outer periphery of which is wound a fishing line, a front and a rear wall provided at both axial ends of said trunk, and a cylindrical wall extending axially rearward of said rear wall from the outer periphery thereof; and a drag mechanism applying resistance against rotation of the spool; said sound generating mechanism comprising, sounding teeth mounted to be stationary with respect to said spool spindle, and a sound generating element in mesh with said teeth for making successive clicking sounds, said sound generating element comprising a long strip of elastic material having a support portion bent in a circular arc and in engagement with an inner periphery portion of said spool, an extension portion extending radially inwardly of said support portion from the tip thereof, and a sound generating portion provided at said tip of the extension portion, said sound generating element being attached to said inner periphery portion in relation of having said sound generating portion positioned ahead of said support portion in the direction of spool rotation when a line is drawn out therefrom, so that when said spool rotates in the direction of drawing out the line said support portion diametrically expands to lock against the inner periphery portion of said spool to thereby cause said sound generating portion to move relative to said teeth and make a clicking sound and, when said spool rotates in the direction of winding up the line, said support portion diametrically contracts so that said support portion slips relative to said spool and said sound generating portion does not move relative to said teeth so that no clicking sound is made.

2. The sound generating mechanism according to claim 1, wherein said sound generating element is formed of a long plate-like strip.

3. The sound generating mechanism according to claim 2, wherein said extension portion and sound generating portion of said sound generating element are made narrower than said support portion.

4. The sound generating mechanism according to claim 1, wherein said sound generating element is formed of a wire.

5. The sound generating mechanism according to claim 4, wherein said sound generating element is bent in a spiral.

6. The sound generating mechanism according to claim 1, wherein said sounding teeth are provided at the outer periphery of a disc, said disc being fixed to said spool spindle.

7. The sound generating mechanism according to claim 1, wherein said sounding teeth are provided at the outer periphery of a tubular fixed member fixed to said spool.

8. The sound generating mechanism according to claim 1, wherein said sounding teeth are provided at one side surface of a drag plate of said drag mechanism.

* * * * *